Aug. 30, 1955
T. P. HOWARD
2,716,534
VOLUMETRIC FILLING MACHINE
Filed Sept. 9, 1953
8 Sheets-Sheet 2
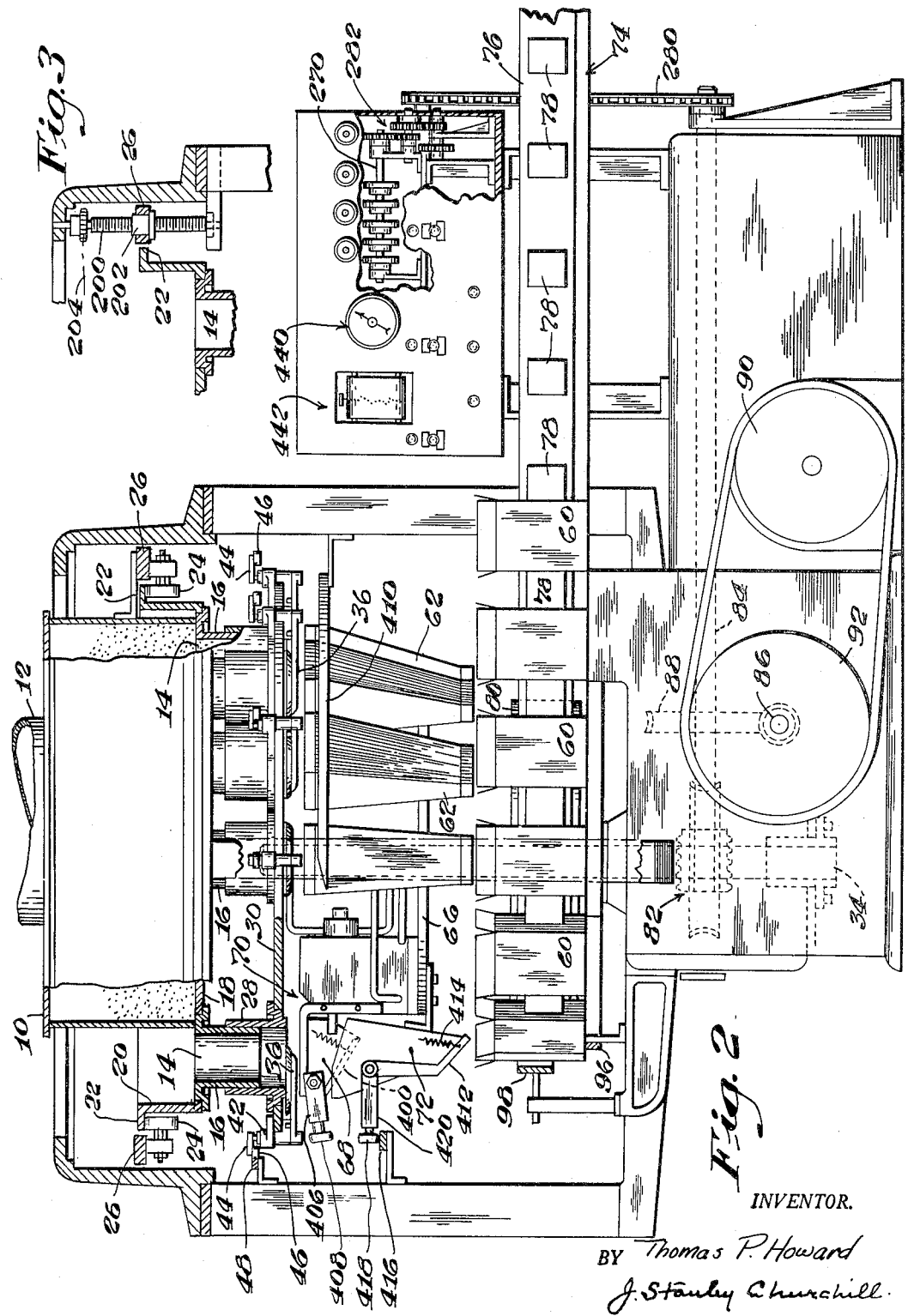
INVENTOR.
BY Thomas P. Howard
J. Stanley Churchill
ATTORNEY

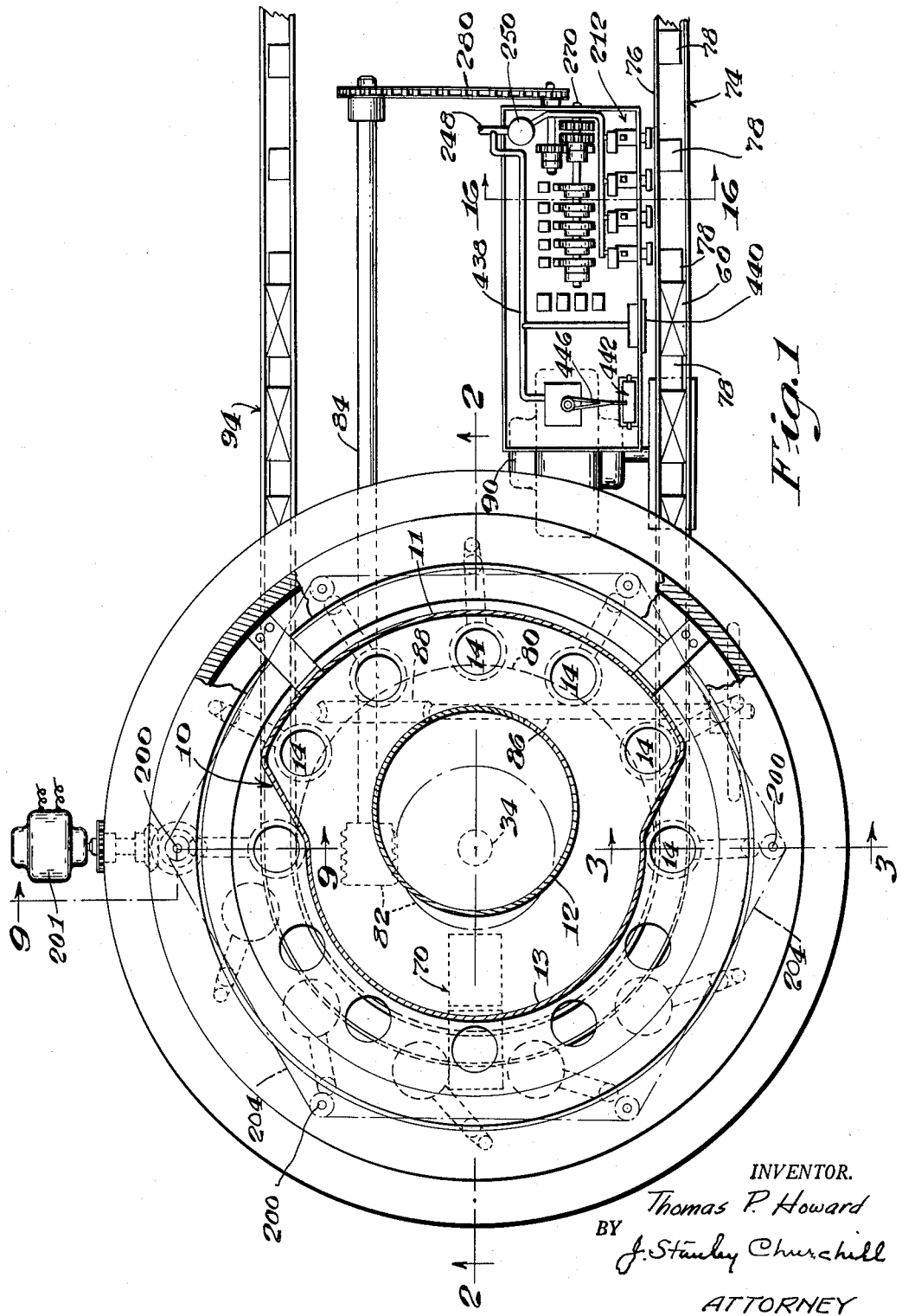

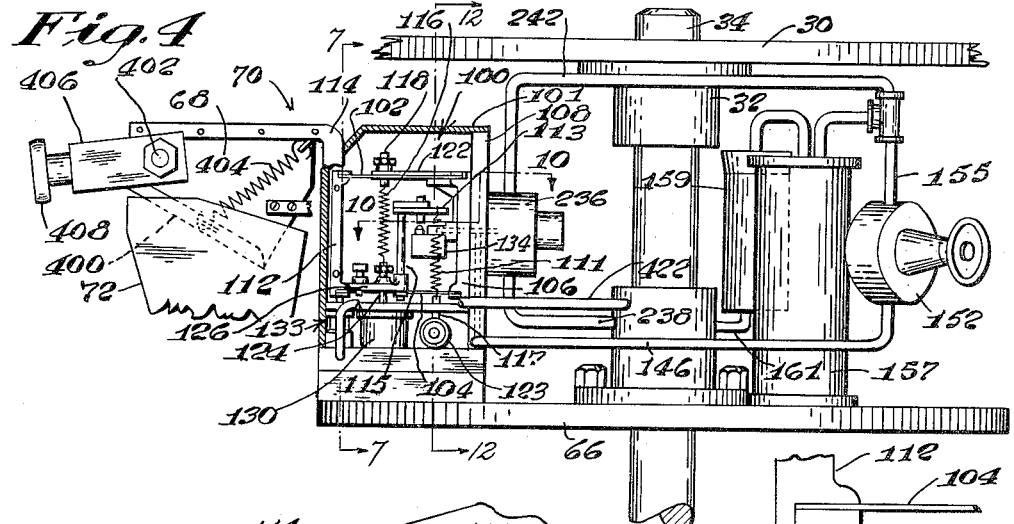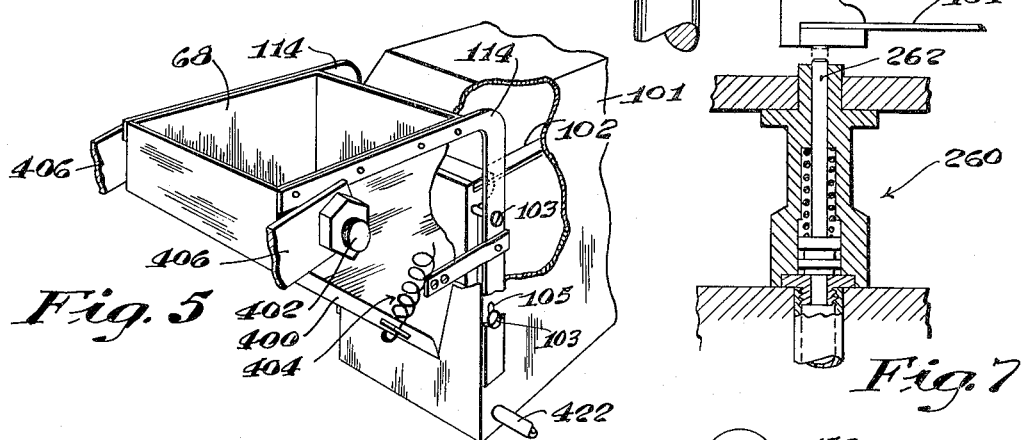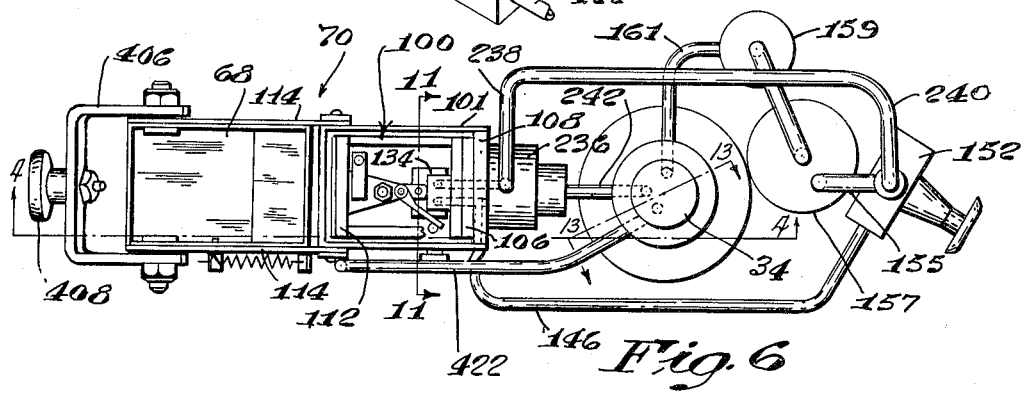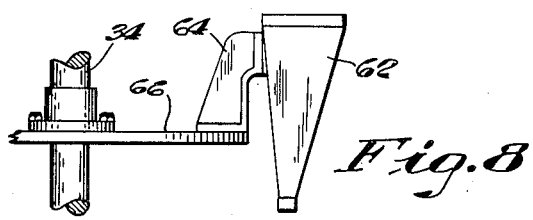

Aug. 30, 1955 T. P. HOWARD 2,716,534
VOLUMETRIC FILLING MACHINE
Filed Sept. 9, 1953 8 Sheets-Sheet 4

INVENTOR.
Thomas P. Howard
BY J. Stanley Churchill
ATTORNEY

Aug. 30, 1955     T. P. HOWARD     2,716,534
VOLUMETRIC FILLING MACHINE
Filed Sept. 9, 1953     8 Sheets-Sheet 5
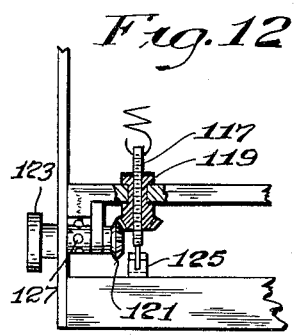
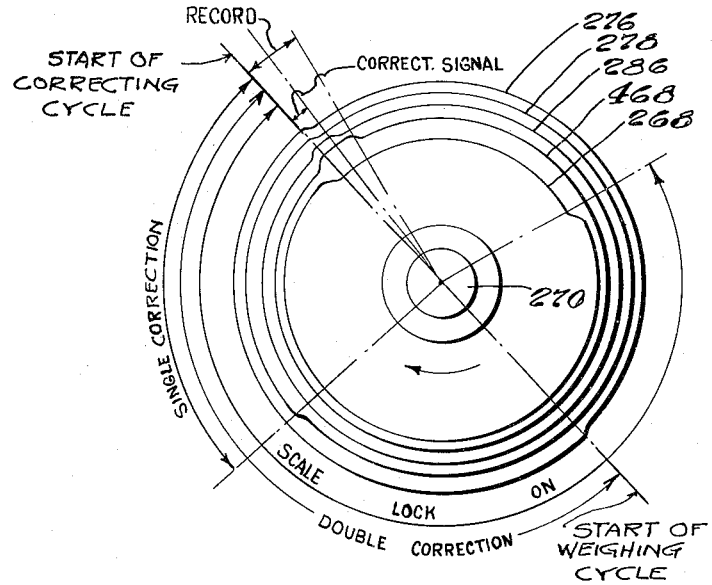
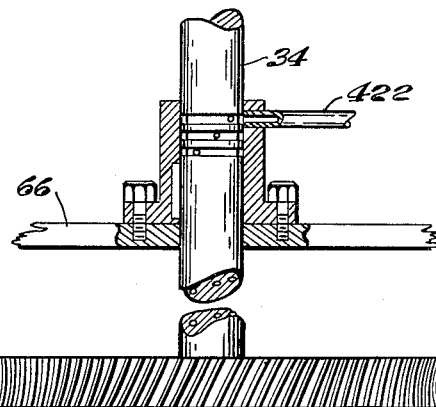
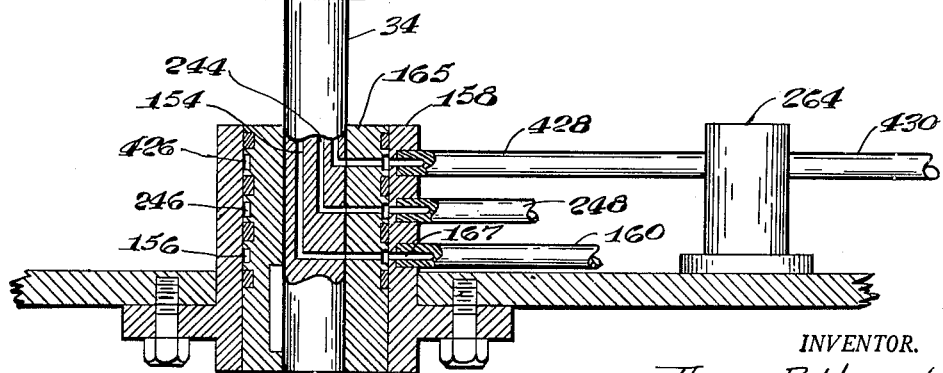
INVENTOR.
Thomas P. Howard
BY J. Stanley Churchill
ATTORNEY Aug. 30, 1955 T. P. HOWARD 2,716,534
VOLUMETRIC FILLING MACHINE
Filed Sept. 9, 1953 8 Sheets-Sheet 6

INVENTOR.
Thomas P. Howard
BY
J. Stanley Churchill.
ATTORNEY

Aug. 30, 1955     T. P. HOWARD     2,716,534
VOLUMETRIC FILLING MACHINE
Filed Sept. 9, 1953     8 Sheets-Sheet 7
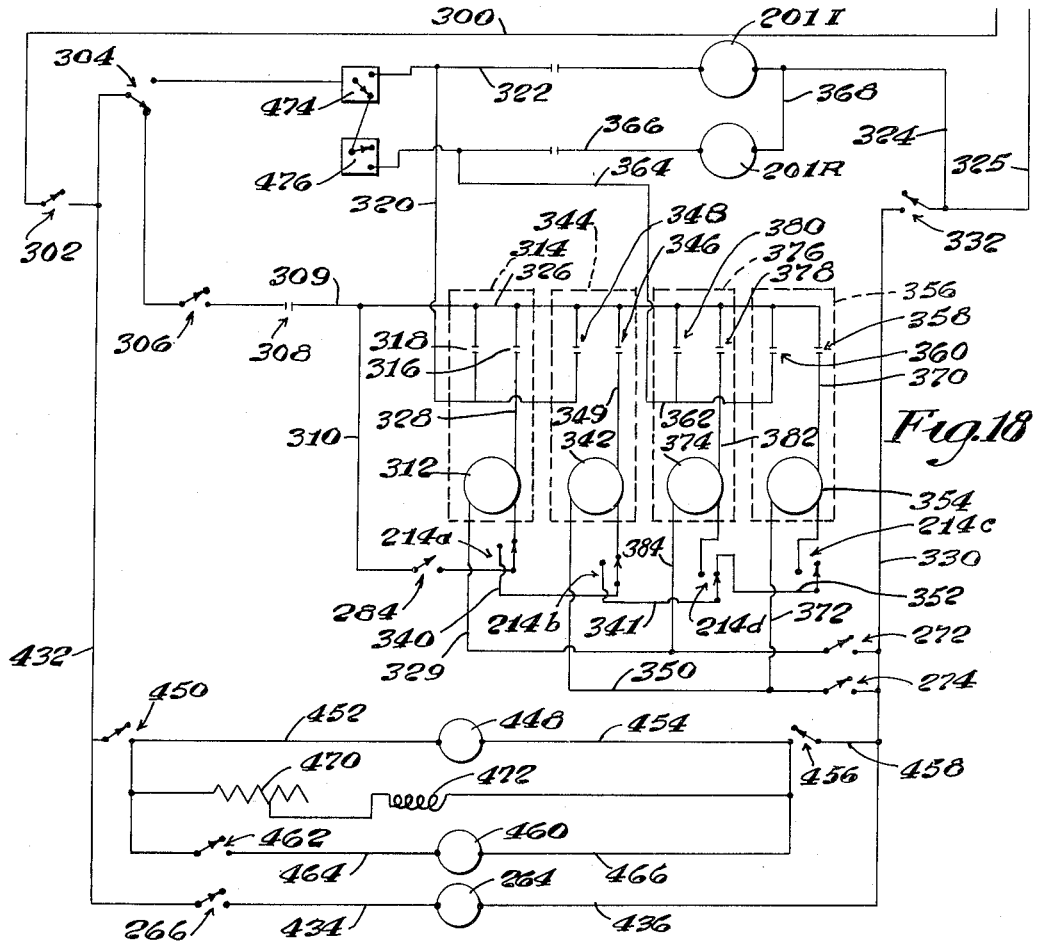
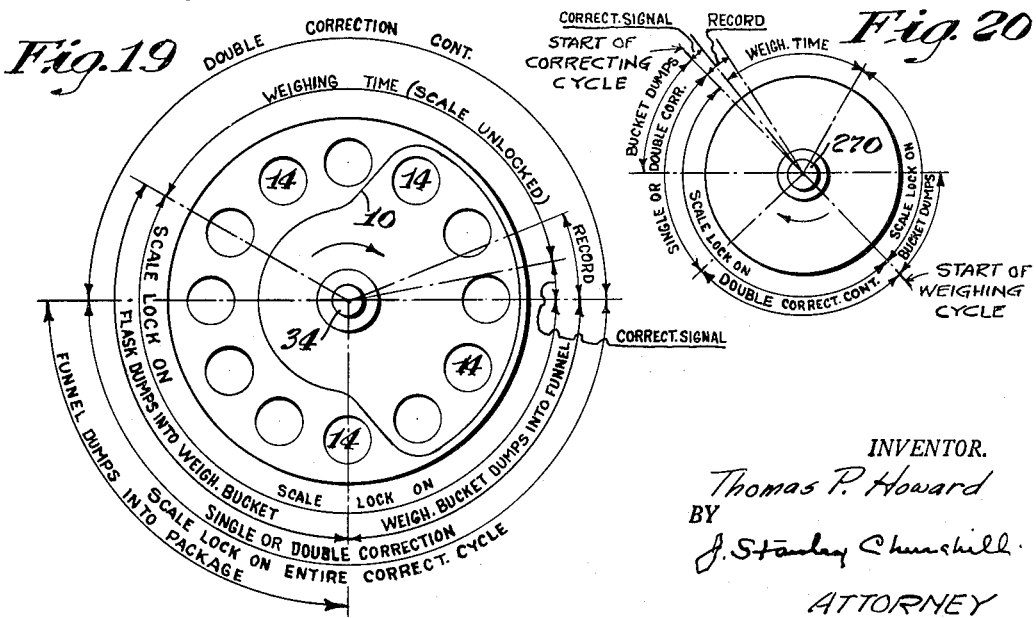
INVENTOR.
Thomas P. Howard
BY
J. Stanley Churchill
ATTORNEY Aug. 30, 1955 T. P. HOWARD 2,716,534
VOLUMETRIC FILLING MACHINE
Filed Sept. 9, 1953 8 Sheets-Sheet 8

INVENTOR.
Thomas P. Howard
BY
J. Stanley Churchill
ATTORNEY

United States Patent Office 2,716,534
Patented Aug. 30, 1955

2,716,534

VOLUMETRIC FILLING MACHINE

Thomas P. Howard, Milton, Mass., assignor to Pneumatic Scale Corporation, Limited, Quincy, Mass., a corporation of Massachusetts Application September 9, 1953, Serial No. 379,116

23 Claims. (Cl. 249—18)

This invention relates to a packaging machine and more particularly to a volumetric filling machine.

One object of the invention is to provide a novel packaging machine in which provision is made for volumetrically forming and for delivering successive measured loads, for periodically check weighing one or more of a series of such measured loads and for adjustably varying the volumes of successive loads by different amounts generally in substantial proportion to the amounts of deviation from a predetermined weight of the weight of the measured load, as determined by the check weighing operation to the end that volumetrically formed or measured loads may be delivered which closely approach a predetermined weight.

A further object of the invention is to provide a novel volumetric filling machine wherein a plurality of measured loads are formed by continuously moving measuring instrumentalities and delivered into the containers arranged to move with the filling instrumentalities during the period that the loads are being formed and delivered into the containers, and in which provision is made for adjustably varying the volume of the loads formed by the volumetric measuring instrumentalities in a graduated manner proportionate in a general way to the degree of variation from a predetermined weight of the weight of the load as determined by the check weighing operation.

With this general object in view and such others as may hereinafter appear, the invention consists in the packaging machine and in the various structures, arrangements and combinations of parts hereinafter described and particularly defined in the claims at the end of this specification.

In the drawings illustrating the preferred embodiments of the invention:

Fig. 1 is a plan view of the present packaging machine;

Fig. 2 is a side elevation of the machine, the upper portion being partly in vertical cross section as viewed from the line 2—2 of Fig. 1;

Fig. 3 is a vertical cross section detail view of the upper portion taken on the line 3—3 of Fig. 1;

Fig. 4 is a side elevation of the check weighing mechanism shown in Fig. 2, some of the parts being broken away and shown in vertical cross section as viewed from the line 4—4 of Fig. 6;

Fig. 5 is a perspective view of the weighing receptacle showing the attachment to the cantilever weighing beam;

Fig. 6 is a plan view of the check weighing mechanism showing the pneumatic connections forming a part of the control mechanism;

Fig. 7 is a vertical cross-sectional detail view of the pneumatically operated scale lock as viewed from the line 7—7 in Fig. 4;

Fig. 8 is a detail view showing the mounting for the material guiding funnels;

Fig. 12 is a detail view, partly in vertical cross section, of a manually operated adjusting mechanism for the cantilever weighing beam as seen from the line 12—12 of Fig. 4;

Fig. 13 is a vertical cross-sectional view showing the compressed air supply lines for the pneumatic control mechanism as connected to and extended through the central shaft, the section being taken on the line 13—13 of Fig. 6;

Fig. 14 is a diagrammatic view of the circuit closing cams indicating the timing for the selective correcting operations;

Fig. 18 is a wiring diagram associated with the selective control mechanism;

Fig. 19 is a diagrammatic plan view indicating the sequence of operations performed during successive cycles of the packaging machine;

Fig. 20 is a timing chart to be referred to;

Fig. 25 is a chart indicating the various pressure ranges to be referred to.

Figure 9:
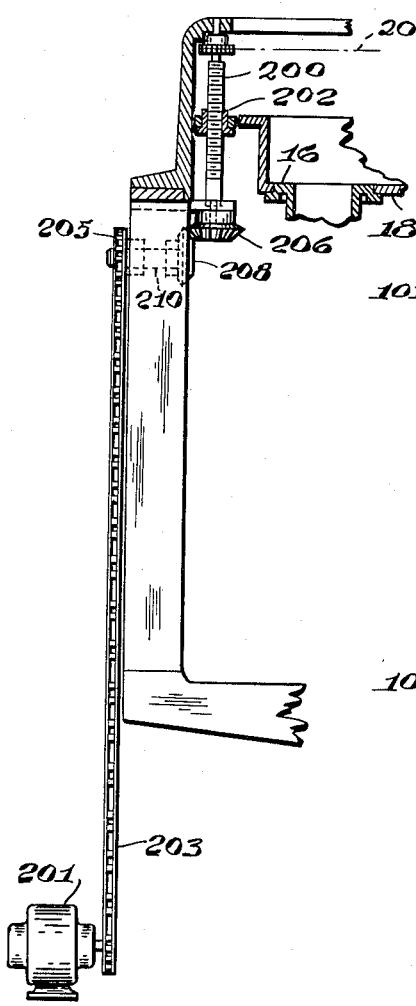
Fig. 9 is a detail view in vertical cross section of the correcting mechanism as viewed from the line 9—9 of Fig. 1.

In general the present invention contemplates a novel packaging machine wherein successive measured loads are formed by volumetric measuring instrumentalities and in which provision is made for periodically check weighing one or more of a series of the measured loads thus formed. The machine is preferably constructed so that the volumetric filling instrumentalities are continuously moved, and preferably, the measured loads thus formed are delivered into containers being moved along with the continuously moved measuring instrumentalities so that after the measured loads have been formed they are delivered into the containers. Provision is also made for check weighing one or more of a series of the measured loads, preferably during the continuous movement of the filling instrumentalities and for adjustably varying the volume of the filling instrumentalities in response to and by an amount which is substantially proportionate to the variation of the weight of a particular weighed load from a predetermined amount. In other words the correction to be applied to the volumetric measuring instrumentalities may be described as being graduated as distinguished from a fixed correction. The graduated degree of correction may be effected by a correction which is proportionate in a general way to the total variation and may be effected by a series of separate increments.

In the preferred embodiment of the invention provision is made for automatically correcting the volume of the measuring chambers and for selectively controlling the correcting mechanism to change the volume of the measuring chambers different amounts in accordance with different variations in weights of successive check weighed loads. Thus, in practice when the weight deviation of a check weighed load is within a relatively small range over or under a predetermined weight, the volume of the measuring chambers is corrected a relatively small amount, and when the weight deviation of the check weighed load exceeds the smaller range and extends into a larger range over or under the predetermined weight, the volume of the measuring chambers is corrected a relatively larger amount. Thus, in operation the present control mechanism is capable of correcting the volume of the measuring chambers during the continuous movement thereof in the event of any deviation in weight from a predetermined weight and is of particular advantage to effect correction of the volume of the measuring chambers in the event of any sudden and relatively great changes in the density of the material being supplied to the measuring chambers whereby to cause the weights of the successive measured loads to closely approach a predetermined weight. These and other features of the invention will be apparent from the following description of the illustrated embodiment of the invention.

Referring now to the drawings, the invention is herein illustrated as embodied in a rotary filling machine of the general type illustrated and described in the United States patent to Delamere et al., No. 1,527,030, and which, as herein shown, may comprise a generally circular non-rotating hopper 10 containing a supply of the material delivered thereto by gravity or otherwise through a pipe 12 connected to a main source of supply, and a series of telescopically adjustable measuring chambers 14 preferably equally spaced in a circle and mounted to revolve beneath the hopper 10 to receive their loads. As illustrated in plan in Fig. 1, the hopper 10 is irregular in shape having a side wall 11 of large radius in one portion of its periphery arranged to extend over a number of the chambers 14 to effect filling thereof as the chambers pass under the extended portion of the hopper. The hopper is also provided with a side wall 13 formed on a smaller radius so that as the chambers are rotated around such side wall they are maintained out of contact with the material in the hopper and are open to the atmosphere.

As illustrated in Fig. 2, the upper portions of the telescopically adjustable measuring chambers 14 may comprise a plurality of flanged tubes 16 supported in and depending from a rotary disk 18 which forms the bottom of the hopper. The rotary disk 18 is provided with an upstanding annular side wall 20 having a flange or track portion 22 arranged to ride on and be supported by a plurality of rollers 24 carried by a vertically adjustable supporting ring 26. The lower portions of the measuring chambers 14 may comprise a plurality of corresponding upstanding tubes 28 telescopically fitted about the upper tubes 16 and supported in a rotary disk 30 secured by a flange member 32 to the upper end of a continuously rotated central shaft 34, the telescoping connection imparting rotary movement to the upper portions of the chambers 14 during the operation of the machine.

As herein shown, each chamber 14 is provided with a cam-operated bottom closure valve 36, and in the operation of the machine successive measuring chambers are filled as they pass under the filling portion 11 of the hopper 10 at which time the bottoms of the chambers 14 are closed by the valves 36, and when the chambers pass out from under the filling portions of the hopper, the valves may be moved to open the bottoms of the chambers to release the measured loads. Each cam-operated valve 36 is fast on a vertical stud rockingly supported in a bearing member 42 attached to the rotary disk 30, the upper end of the stud being provided with an arm 44 carrying a roller 46 for cooperation with a cam piece 48 supported from the machine frame. The valve may be urged to a closed position against a stop by spring means, not shown, and engagement of the rolls 46 with the cam piece 48 is arranged to rock the valve into an open position to effect release of the measured load.

In the operation of the machine all of the measured loads in the chambers 14, except one load, are released into successive cartons 60 being moved along therebeneath, the material being guided into the cartons through funnels 62 supported by brackets 64 attached to a rotary disk 66 fast on the central shaft 34. The remaining measured load may and preferably will be deposited in a weighing receptacle 68 forming a part of the check weighing mechanism, indicated generally at 70, such check weighed load being subsequently released into a second receptacle 72 disposed beneath the weighing receptacle, and thereafter the load is released from the lower receptacle 72 into a carton 60 disposed therebeneath during a succeeding revolution of the filling units, as will be hereinafter more fully described.

As shown in Fig. 1, the cartons 60 may be delivered to the machine along a conveyor 74 by an upstanding flexible metal belt 76 having a series of spaced blocks 78 attached thereto and between which the cartons are engaged. The belt 76 is arranged to cooperate with a driving pulley 80 fast on the central shaft 34 and arranged to register successive cartons in alignment with their respective filling units, the belt being provided with suitable projections for engagement in sockets, not shown, formed in the pulley 80. As illustrated in Fig. 1, the central shaft 34 may be driven through a worm gear drive 82 connected to a shaft 84 which in turn may be connected to a drive shaft 86 through a second worm gear drive 88. The drive shaft 86 may be driven by an electric motor 90 belted to a pulley 92 fast on the shaft 86. In the operation of the filling machine the cartons may be delivered along the conveyor 74 from a supply thereof, and successive cartons 60 are arranged to come into alignment with successive filling units at the point of tangency with the semicircular path through which the cartons are guided in the machine, the cartons remaining in alignment with their respective filling units through 180° and then being delivered from the machine on a discharge conveyer 94. The cartons may be guided through the semicircular path on a bottom support rail 96 and by a side rail 98, as shown in Fig. 2.

Provision is made in accordance with the present invention for automatically correcting the volume of the telescopic measuring chambers 14 by adjusting the upper portion 16 of the chambers relative to the lower portions 28 when the weight of the measured load as detected by the check weighing unit 70 is found to deviate abnormally beyond a predetermined range, as will be hereinafter more fully described.

As illustrated in Figs. 3 to 6, the weighing unit 70 is disposed immediately beneath a measuring chamber 14, the weighing receptacle 68 being attached to and forming a part of the free end of a cantilever spring beam 100 herein shown as comprising two upper and two lower relatively stiff cantilever leaf springs 102, 104 of equal length, the leaf springs being connected at their inner ends to a rigid member 106 attached to an upstanding end frame 108 mounted on the rotary supporting disk 66. The other ends of the leaf springs 102, 104 may be secured to a second rigid member 112 to which the weighing receptacle 68 is attached by straps 114. As indicated in Figs. 4 and 5, the weighing beam and associated mechanism are enclosed in a casing 101, the straps 114 being connected to the member 112 by screws 103 extended through vertical slots 105 formed in the side walls of the casing.

The two rigid members 106, 112 together with the leaf springs 102, 104 constitute a four-bar linkage so that when a load is placed within the weighing receptacle, the weight thereof results in imparting to the receptacle a straight-line motion in a vertical direction so that every particle in the weighing receptacle moves with the same displacement, direction and velocity, and so that any particle produces the same spring deflection no matter where it is located in the receptacle. The weighing beam 100 is also provided with a coil spring 116 arranged to exert a counterforce upon the spring beam, the spring 116 being connected at its upper end to a bolt 118 adjustably secured in a bracket 122 attached to the rigid member 106, as shown in Fig. 4. The lower end of the coil spring 116 may be connected to a rod 124 fast in an arm 126 extending from the rigid member 112 of the spring beam 100. The rod 124 may extend below the arm 126 and may be provided with a piston operating in oil contained in a dash pot 130 attached to the base of the weighing unit. A second coil spring 111, adapted for fine adjustment of the weighing unit, is connected at its upper end to an arm 113 extended from the upper end of a rod 115 supported in the arm 126, the lower end of the spring 111 being connected to a threaded spring stud 117 cooperating with a bevel gear nut 119 supported in the base of the weighing unit, as illustrated in detail in Fig. 12. The bevel gear nut 119 is arranged to mesh with a second bevel gear 121 which is arranged to be rotated by a handle 123 to effect manual adjustment of the coil spring 111 to increase or decrease the tension thereof. Any usual or preferred means may be employed to prevent rotation of the spring stud 117, such as a slotted bracket 125 through which the flattened end of the spring stud may extend. A spring pressed ball and socket connection, indicated at 127, may be provided between the base and an extended portion of the handle 123 to hold the parts in their adjusted position. The cantilever spring beam 100 may be adjustably limited in its vertical movement by stop means indicated generally at 133.

In practice, the coil spring 116 serves to counteract the weight of the weighing receptacle 68 and associated parts which are mounted upon the outer ends of the leaf springs, the coil spring 116 being of such strength as to support nearly all of the weight of the measured load being check weighed without deflection of the leaf springs so that the deflection of the leaf springs may be proportionate to the deviation in weight above a predetermined minimum weight limit. For example, a load weight of 15 ounces may be used, and weights above 15 ounces will deflect the leaf springs proportionately to the excess above 15 ounces.

As herein shown, provision is made for measuring the deflection of the spring beam 100 when depressed by the load being check weighed to indicate the weight of the load and more particularly to detect any deviation over or under a predetermined weight. In practice the stiff cantilever springs 102, 104 are selected so that the weighing beam has a relatively small deflection value, and sensitive pneumatically operated control means, indicated generally at 134, is arranged to cooperate with the present spring beam for indicating or measuring the relatively small deflection of the spring beam when depressed by the load released from a measuring chamber 14. The pneumatically operated unit 134 is constructed so that a large pressure change occurs upon deflection of the spring beam through a minute distance, and in general the deflection of the spring beam is arranged to vary the pressure in the pneumatically operated unit by an amount proportionate to the deflection, an overweight load effecting a relatively large increase in pressure, and an underweight load increasing the pressure a lesser amount, and such different pressures may be translated into movement to effect actuation of volume-correcting mechanism whereby to effect a decrease or an increase respectively in the volume of the measuring chambers 14 when an abnormal deviation from a predetermined weight is detected. The present invention is characterized by novel correcting mechanism wherein provision is made for selectively adjusting the measuring chambers 14 to increase or decrease the volume a greater or lesser amount in accordance with different pressure values preferably in different predetermined ranges.

Figure 10:
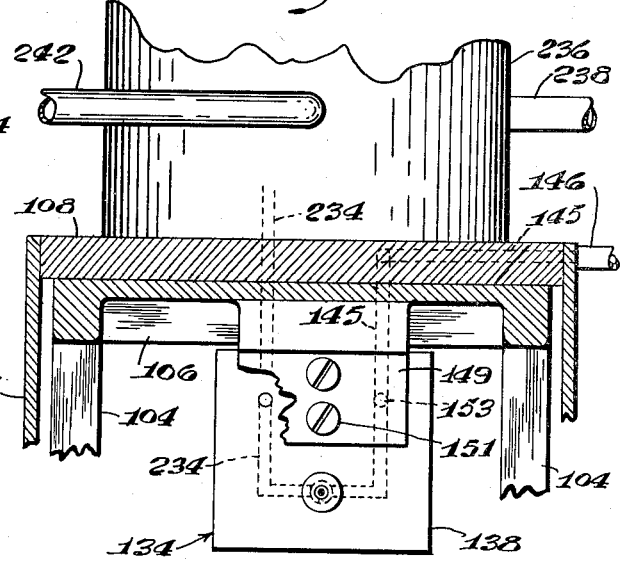
Fig. 10 is a horizontal cross-sectional view of the pneumatically operated control mechanism associated with the cantilever weighing beam, as viewed from the line 10—10 of Fig. 4.
Figure 11:
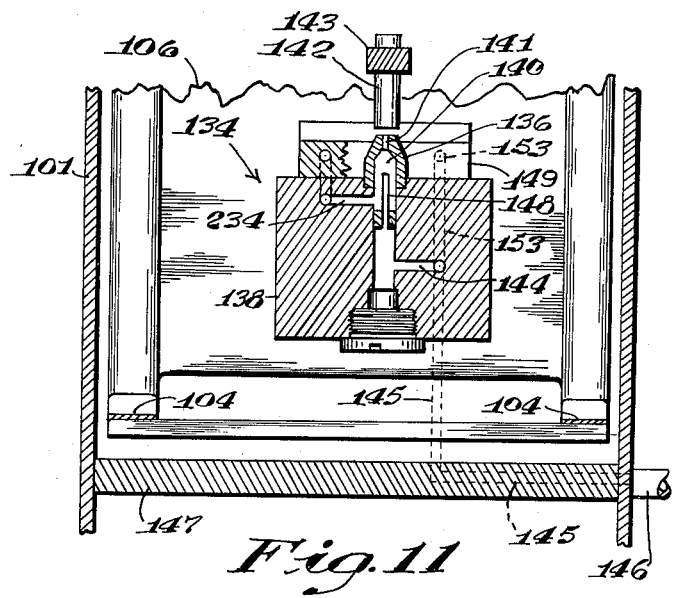
Fig. 11 is a vertical cross-sectional view taken on the line 11—11 of Fig. 6.

As shown in Figs. 10 and 11 the pneumatically operated control mechanism 134 may include a conduit or jet member 136 carried by a block 138 having a relatively small pressure chamber 140 communicating with the jet and through which air under substantial pressure may be caused to flow to be discharged through a small discharge orifice 141 in the jet arranged to cooperate with a valve member 142 adjustably mounted in an arm 143 on the rod 115 carried by the arm 126 extended from the free end of the weighing beam unit 100. The inlet 144 may be supplied with a regulated source of air through a pipe 146 and connecting passageways 145 formed in a bottom tie member 147, end frame member 108 and through a forwardly extended portion 149 of the rigid member 106 of the weighing beam 100, the block 138 being attached to the extended portion 149 by screws 151, as shown in Fig. 10. The extension 149 is provided with openings communicating with passageway 153 formed in the block 138 and leading to the inlet 144 which communicates with a central passageway having a restricted throat portion 148 comprising a small tube arranged to offer a substantial resistance to the flow of air therethrough. As diagrammatically illustrated in Fig. 15, the inlet pipe 146 may be connected by a secondary regulator 152, air pipe 155, tank 157, secondary filter 159, and pipe line 161 to a passageway 154 formed in the continuously rotated central shaft 34, the lower end of the passageway 154 communicating with an annular chamber 156 formed in a bushing 165 fast on the lower end of shaft 34 and which is rotatably mounted in a flanged bearing member 158 having a communicating opening 167 therein, see Fig. 13, which in turn may be connected by a pipe 160 through a primary regulator 161 and a primary filter 163 to the source of air thereby enabling the pneumatically operated unit 134 to be supplied with air during the continuous rotation of the check weighing unit 70 with the shaft 34. In operation the spring beam unit 100 may be adjusted to maintain the valve member 142 in a slightly elevated position spaced from the small discharge orifice 141, and upon minute deflection of the spring beam under the influence of the load, the valve 142 is moved toward the discharge orifice a minute amount thereby effecting a substantial pressure rise in the chamber 140 between the discharge orifice 141 and the restricted throat portion 148.

As herein shown provision is made for utilizing the increase in pressure in the chambers 140 through novel control mechanism adapted to automatically effect adjustment of the upper portion 16 of the measuring chambers 14 relative to the lower portion 28 thereof in a manner such as to vary the volume of the chamber different amounts in accordance with different deviations in the weights of the measured loads within selected ranges beyond commercially acceptable limits as detected by the check weighing mechanism. As illustrated in Fig. 9, the correcting mechanism may include a plurality of screws 200 rotatably mounted in the machine frame, see Fig. 3, and arranged to cooperate with nuts 202 secured in the supporting ring 26. The screws 200 may be connected to rotate together by a chain and sprocket drive 204, and one of the screws may be provided with a bevel gear 206 arranged to mesh with a bevel gear 208 fast on a shaft 210 mounted for rotation in the machine frame. Rotation of the screws 200 may be effected by control mechanism including a reversible electric motor 201 connected by a chain 203 to a sprocket 205 fast on the end of the shaft 210 on which the bevel gear 208 is mounted, the motor 201 forming part of a control circuit for selectively adjusting the chambers, as will be described. In operation rotation of the screws 200 in one direction will effect elevation of the upper portions 16 of the measuring chambers to increase the volume of subsequent loads, and rotation of the screws in the opposite direction will cause the upper portions 16 to be lowered into the portions 28 to decrease the volume of the chambers.

Figure 17:
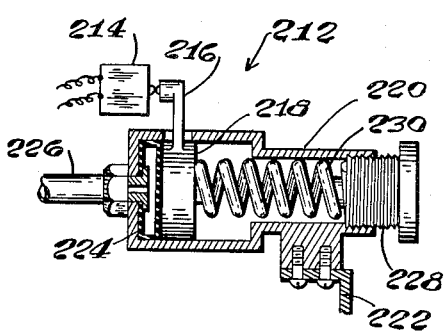
Fig. 17 is longitudinal cross-sectional view of the pneumatically operated switch mechanism taken on the line 17—17 in Fig. 16.

In order to effect different adjustments of the measuring chambers 40 corresponding to different deviations in weights of the measured loads, a plurality of pneumatically controlled switch operating units 212 are provided, the switches 214 forming a part of the electrical circuit arranged to effect operation of the reversible motor in one direction or the other and for different periods of time. As illustrated in detail in Fig. 17, each pneumatically controlled switch operating unit 212 includes a contact engaging arm 216 extended from a disk 218 slidingly mounted in a casing 220 supported in a bracket 222 from the machine frame. One end of the casing 220 is provided with a pressure responsive element herein shown as comprising a rubber bellows 224 in communication with an air pipe 226 forming a part of the pneumatic control system, the rubber bellows being engageable with one face of the disk 218. The other end of the casing is provided with an adjusting screw 228 and a coil spring 230 interposed between the opposite face of the disk 218 and the end of the screw. The spring 230 may be adjusted so that the contact engaging arm 216 is normally in engagement with the microswitch 214 to hold the same in an inoperative position, and so that in operation when the pressure in the bellows 224 reaches a predetermined amount the arm 216 is urged away from the switch to permit it to close a selected circuit to effect variable adjustment of the measuring chambers, as will be described.

Figure 15:
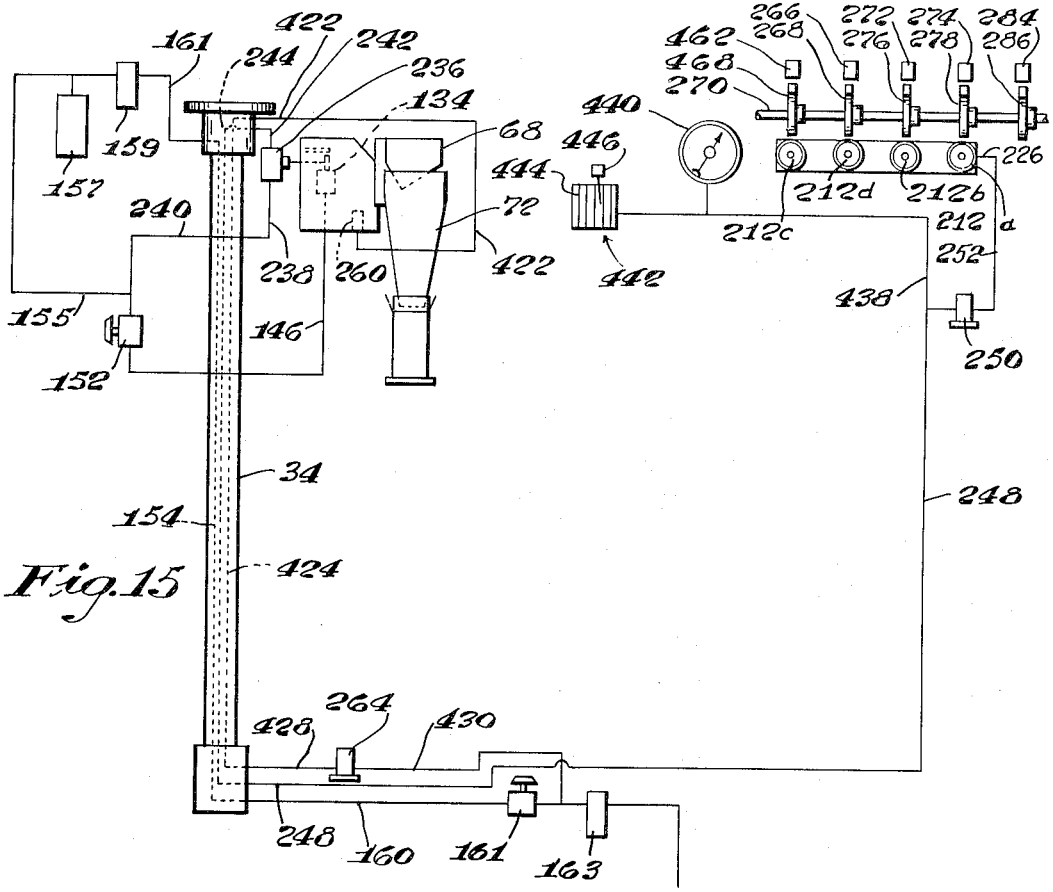
Fig. 15 is a diagrammatic view of the air lines for the pneumatic control mechanism.

As diagrammatically illustrated in Fig. 15, provision is made for amplifying and controlling the pressures built up in the chamber 140 of the pneumatic control mechanism 134 to provide sufficient air flow and pressure to operate the pneumatically controlled switch operating units 212, and as illustrated in detail in Figs. 10 and 11, the chamber 140 is connected by passageways 234 to a pressure transmitting unit 236 mounted on the end frame member 108. The transmitting unit 236 may comprise a commercially available unit functioning in the manner of an automatic pressure regulator and is provided with an inlet 238 connected by a branch air line 240 from the line 155. The outlet 242 is arranged to communicate with a return passageway 244 formed in the central shaft 34, the lower end of the passageway communicating with a second annular chamber 246 formed in the bushing 165 which in turn is connected through the flanged member 158 by a pipe line 248, solenoid valve 250, and pipe line 252 to the lines 226 leading to the pressure responsive bellows 224 of the pneumatically controlled switch operating units 212.

In practice the regulated pressure supplied to the pneumatic control mechanism 134 may be approximately forty pounds as controlled by the secondary regulator 152 for efficient operation, and the regulated pressure supplied to the transmitting unit 236 may be approximately sixty pounds as controlled by the primary regulator 161. In operation the variations in pressure in the chamber 140 as caused by depression of the weighing beam 100 are arranged to modify the pressure in the transmitting unit 236 an amount proportionate to the increase in pressure in the chamber 140 to effect operation of the pneumatically controlled switch operating units 212.

Figure 25:
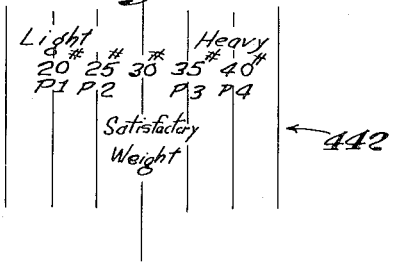

In the illustrated embodiment of the invention four pneumatically controlled switch operating units 212 are shown, each being arranged to be actuated upon progressively higher pressures in the chamber 140 of the pneumatic unit 134 as effected by the depression of the spring beam 100 under the influence of the check weighed load, each operating unit 212 being arranged to close a different circuit to effect a preselected correction in the volume of the chambers 14. In practice the operating units 212 may be adjusted so as to be actuated by pressures within prescribed ranges over or under a correct or commercially acceptable weight, as indicated diagrammatically in Fig. 25. For example, if the measured load being check weighed depresses the spring beam 100 a relatively small amount, indicating a greatly underweight load, a relatively small increase in pressure below the point indicated by P1 in Fig. 25 is effected in the unit 134 which will actuate an operating unit 212a to effect closing of a circuit to the motor 201 arranged to increase the volume of the chambers 14 a relatively large amount; any increase in pressure in a range beyond the point P1 and up to P2, indicating an underweight load requiring a lesser adjustment of the chambers 14, will actuate a second operating unit 212b to effect closing of a circuit arranged to increase the volume a smaller amount. Any further increase in pressure in a range beyond P2, and up to P3, indicating a correct weight load within commercially accepted limits, will not actuate any of the operating units 212 so that no correction is made in the volume of the chambers. Any increase in pressure in a range between P3 and P4, indicating a slightly overweight load, will actuate a third operating unit 212c to effect closing of a circuit to the motor 201 arranged to decrease the volume a small amount; and any increase in pressure beyond P4, indicating a relatively larger overweight load, will actuate a fourth operating unit 212d to effect closing of a circuit to the motor 201 arranged to decrease the volume of the chambers 14 a relatively greater amount.

In practice the present volumetric filling machine is arranged to operate in cycles with respect to the check weighing unit 70, wherein one revolution of the rotary filling unit comprises a check weighing cycle, and a succeeding revolution thereof comprises a correcting cycle, as diagrammatically indicated in Figs. 19 and 20 to be described. As herein shown, provision is made for locking the weighing beam 100 during the correcting cycle and for unlocking the weighing beam during a portion of the check weighing cycle to permit the beam to be depressed under the influence of the load and to actuate the selected operating unit 212. As illustrated in Fig. 7, the weighing beam lock may comprise a pneumatically operated unit 260 having a spring-pressed plunger 262 arranged to engage the underside of the beam 100 to hold it in inoperative position during the correcting cycle. As indicated in Fig. 15, the compressed air line to the beam locking unit 260 includes a solenoid operated valve 264 arranged to be actuated by closing of a switch 266 by a cam 268 fast on a cam shaft 270, the cam 268 permitting opening of the switch 266 to deenergize the solenoid and close the valve during a portion of the weighing cycle.

Provision is also made for limiting the duration of operation of the reversible chamber correcting motor 201 during the correcting cycle, and as herein shown, two cam operated switches 272, 274 are provided in the motor circuit, the switch 272 being closed by a cam 276 fast on the cam shaft 270 and the switch 274 being closed by a cam 278 also fast on the shaft 270. The cam 276 is arranged to limit the time of operation of the motor 201 to effect a relatively large adjustment of the chambers 14 in either direction, and the cam 278 is arranged to limit the time of operation of the motor to effect a relatively small adjustment of the chambers 14 in either direction, the operating units 212 effecting closing of the selected circuit for operation of the motor in one or the other direction to increase or decrease the volume of the filling chambers 14.

Figure 16:
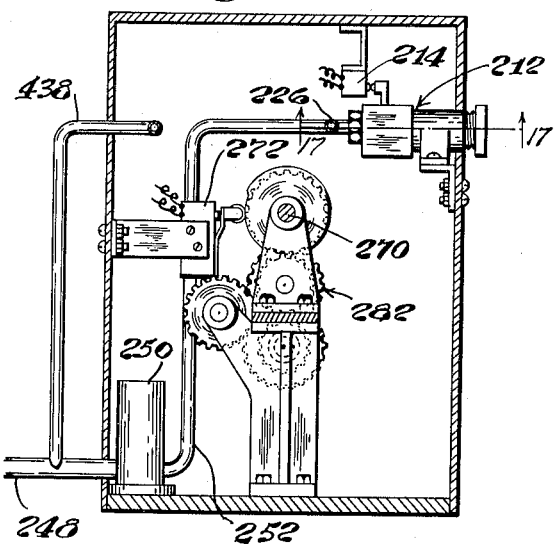
Fig. 16 is a vertical cross-sectional view of a portion of the control mechanism as viewed from the line 16—16 of Fig. 1.

In order to control the operation of the filling machine to provide successive check weighing and correcting cycles, the cam shaft 270 is arranged to be rotated at a ratio of one to two with relation to the rotation of the filling heads so that one-half revolution of the cam shaft 270 is equal to a full revolution of the filling heads, succeeding one-half revolutions of the cam shaft corresponding to successive weighing and correcting cycles respectively of the filling heads. As illustrated in Figs. 2 and 16, the cam shaft 270 is arranged to be driven from the shaft 84 of the filling machine by a chain and sprocket drive 280 and through a gear train 282 to effect rotation of the cam shaft one-half revolution for each revolution of the filling heads.

It will be understood that in operation a measured load is delivered into the check weighing receptacle each cycle of operation and is subsequently released into the lower receptacle 72 during the same cycle, to be in turn released into a carton moving along therewith during the next cycle of operation. However, a check weighing operation is performed during only every other cycle which is effected by unlocking of the weighing beam during a portion of the check weighing cycle, the weighing beam remaining locked during the entire correcting cycle. Thus, in the operation of the machine, after the first cycle of operation, the carton being moved along beneath the weighing unit 70 will be provided with a measured load released from the receptacle 72 each cycle of operation.

Referring now to Fig. 18, the electrical diagram therein shown in association with the various pressure operated switches 214 and the cam operated switches defines the different circuits for effecting selective adjustment of the measuring chambers and includes four microswitches 214a, 214b, 214c and 214d arranged to be actuated by their individual pneumatically operated units 212. The reversing motor 201 is indicated in the diagram by motor reversing starters 201I for operating the motor in one direction to increase the volume and 201R for operating the motor in the other direction to reduce the volume of the measuring chambers. The cam operated switches for determining the extent of adjustment are indicated at 272 and 274, and a third cam operated switch 284 comprising a signal switch is arranged to be closed by a cam 286 at the beginning of the correcting cycle to energize the circuit and initiate the correcting operation.

The circuit to the motor reversing starters includes a line 300 from the main line, manually operated switches 302, 304, 306, a carton feed operated switch 308, lines 309, 310 and signal switch 284 to a terminal of the first pneumatically operated switch 214a. As indicated in Fig. 18, the pneumatically operated switches 214a, 214b, 214c and 214d are arranged to be connected in series and are normally maintained in the position shown in Fig. 18, wherein the switch 214a is closed to energize a coil 312 of a magnetic switch 314 which operates to close the circuit at contacts 316 and 318, the circuit to one terminal of the motor starter 201I being completed through lines 320, 322, the other terminal of the motor starter 201I being connected by a line 324 to the main return line 325. The magnetic switch contacts 316 are arranged to close a holding circuit to the coil 312 from the line 309 through lines 326, 328 to one terminal of the coil, then through line 329 through the cam operated switch 272, and through line 330 and manually operated switch 332 to the main line 325.

Thus, in operation when the check weighed load causes a relatively low pressure, below P1, which may for example be any pressure in the range below twenty pounds air pressure, indicating that the load is greatly underweight requiring a large increase in the volume of the chambers, the switch 214a will remain in its normally closed position, and when the signal switch 284 and cam operated switch 272 are closed at the start of the correcting cycle, the motor 201 will be energized to effect an increase in the volume of the measuring chambers, the cam operated switch 272 holding the circuit closed for a relatively long interval of time to effect a relatively great increase in volume to correct the lightweight condition of the load. The motor circuit is opened by the cam switch 272 at the end of the predetermined time interval to discontinue the correcting operation and to deenergize the magnetic switch coil 312. It will be understood that the signal switch 284 is closed only momentarily, until the holding circuit is energized to initiate the correcting operation, the cam operated switch 272 being closed substantially simultaneously with closing of the signal switch, as diagrammatically indicated in Fig. 14.

Figure 21:
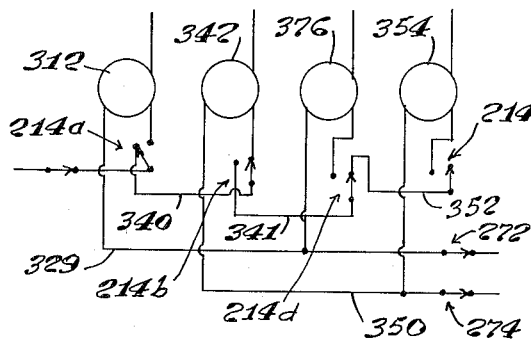
Figs. 21, 22, 23 and 24 are views showing a portion of the wiring diagram in Fig. 18, illustrating the pneumatically controlled switches in different positions of operation for different pressure ranges as controlled by the check weighed load.

When the check weighed load effects an increase in pressure beyond P1, in a range between twenty and twenty-five pounds for example, but below P2, indicating that the check weighed load is only slightly underweight, the switch 214a is actuated to open the circuit to coil 312 and to close the circuit through line 340 to a terminal of a second normally closed pneumatically operated switch 214b, as indicated in Fig. 21. Thus, the circuit is closed to energize coil 342 of magnetic switch 344 which operates to close the circuit at contacts 346, 348, the circuit being continued through lines 320, 322 to one terminal of the motor starter 201I, the other terminal being connected to the main line 325 by line 324 to effect an increase in the volume of the measuring chambers. The contacts 346 forming a part of the holding circuit from line 326 continue the current through line 349 to one terminal of the coil 342, the other terminal being connected by line 350 to cam operated switch 274, the switch continuing the circuit through lines 330 and switch 332 to the main line 325. The cam operated switch 274 is arranged to be closed but a relatively short time to increase the volume of the chambers a smaller amount to correct the underweight condition.

Figure 22:
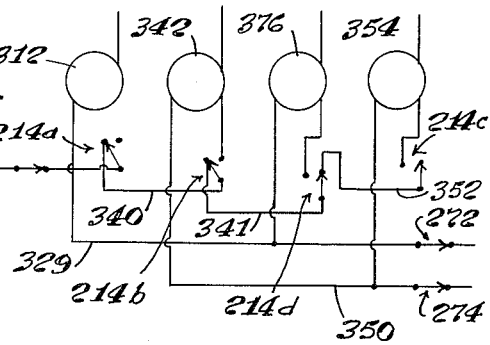
Figure 23:
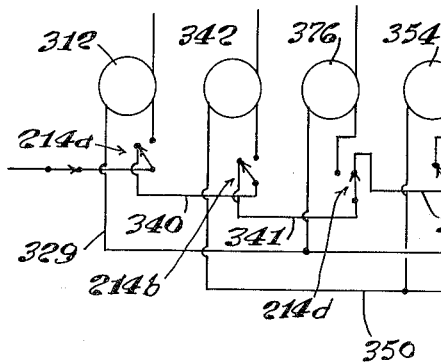

When the check weighed load effects an increase in pressure beyond P2, in a range between twenty-five and thirty-five pounds, but below P3, indicating that the load is of a satisfactory weight within commercially acceptable limits, both pneumatically operated switches 241a and 214b will be actuated to open the circuits to their respective coils 312, 342, and since the switches 214c and 214d are normally opened, as indicated in Fig. 22, no correction in the volume is made. A pressure above P3, in a range between thirty-five and forty pounds air pressure, but below P4, indicating that the load is slightly overweight will effect actuation of switches 214a and 214b to continue the circuit through lines 340, 341 and through switch 214d and line 352 to switch 214c, the latter being actuated to close the circuit to the coil 354 of magnetic switch 356, as indicated in Fig. 23, which operates to close the circuit at contacts 358, 360. The circuit is continued through lines 362, 364, 366 to one terminal of the reversing motor starter 201R, the other terminal being connected to the main line 325 by lines 368, 324 to thus energize the motor to effect a decrease in the volume of the measuring chambers. The contacts 358 forming a part of the holding circuit from line 326 continues the current through line 370 to one terminal of the coil 354, the other terminal being connected by line 372 to cam operated switch 274, the latter continuing the circuit through lines 330 and switch 332 to the main line 325. The cam operated switch 274, as previously described, is arranged to be closed but a relatively short time to decrease the volume of the chambers a relatively small amount to correct the overweight condition.

Figure 24:
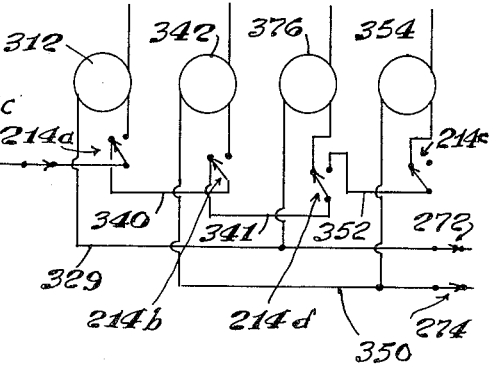

As illustrated in Fig. 24, when the check weighed load effects an increase in pressure beyond P4 or in the range above forty pounds air pressure for example, indicating that the load is greatly overweight, all of the pneumatically operated switches will be actuated, the current passing through switches 214a, line 340, switch 214b, line 341 and switch 214d to one terminal of the coil 374 of magnetic switch 376, the switch 214c being rendered ineffective by opening of the line at 214d, as illustrated. Energization of coil 374 effects closing of the circuit at contacts 378, 380 and the circuit is continued through lines 362, 364, 366 to the reversing motor starter 201R to effect a decrease in the volume of the measuring chambers. The contacts 378 forming a part of the holding circuit from lines 309, 326 continue the current through lines 382 to one terminal of the coil 374, the other terminal being connected by lines 384, 329 to the cam operated switch 272, the latter continuing the circuit through lines 330, and switch 332 to the main line 325. The cam operated switch 272, as previously described, is arranged to be closed a relatively long time to decrease the volume of the chambers a relatively large amount to correct the overweight condition.

In the operation of the present volumetric filling machine, as thus far described, successive measuring chambers 14 are filled as they pass under the filling portion of the hopper 10, the chambers remaining under the filling portion through substantially one-half a revolution of the filling units, during which time the valves 36 are closed and the chambers 14 are filled. When the chambers come into alignment with their respective cartons, the valves 36 are opened by the cam piece 48 to release the measured loads, the valves remaining open through substantially 180 degrees, whereupon the valves are again closed.

During the travel of the filling units in alignment with their cartons, all of the measured loads except the one associated with the weighing unit 70 are delivered through the funnels 62 directly into their respective cartons 60 disposed therebeneath, the remaining load being released into the weighing receptacle 68.

As illustrated in Figs. 2 and 4, the weighing receptacle 68 is provided with a shutter 400 pivotally mounted at 402 and normally maintained in a closed position by a spring 404. The shutter is also provided with an operating arm 406 having a cam roll 408 arranged to cooperate with a cam piece 410. The shutter 400 remains closed until after the load has been check weighed, whereupon the check weighed load is released into the lower receptacle 72, as diagrammatically indicated in Fig. 19, immediately prior to coming into alignment with the cartons during a succeeding revolution of the filling heads. As shown in Fig. 2, the lower receptacle 72 is also provided with a shutter 412 normally maintained in a closed position by a spring 414 and arranged to be opened by a cam piece 416 cooperating with a roller 418 carried by the shutter arm 420. When the lower receptacle comes into alignment with the cartons, the shutter 412 is opened to release the previously check weighed load into a carton, the shutter being subsequently closed at the point where the cartons are discharged onto the delivery conveyer.

In practice the above operations occur each cycle of the filling machine, and as above described provision is made for controlling the machine to enable it to perform alternate check weighing and correcting cycles. As herein shown, this may be accomplished by unlocking the weighing beam during a portion of the check weighing cycle, as indicated in Fig. 19, to permit the beam to cooperate with the pneumatic unit 134 to effect operation of the correcting mechanism and to maintain the weighing beam locked during the entire correcting cycle so that no weight indication is permitted during the correcting cycle.

As diagrammatically shown in Fig. 15, the pneumatically actuated scale lock 260, shown in detail in Fig. 7, is connected to an air pipe 422 which is in communication with a passageway 424 formed in the central shaft 34. The lower end of the passageway 424 communicates with an annular chamber 426 in the bushing 165, see Fig. 13, which in turn is connected through the bearing 158 to a pipe 428 leading to the solenoid valve 264. The valve 264 is connected by a pipe 430 to the source of compressed air, as shown.

In operation the valve 264 is normally open so that the locking unit 260 is in operative position to lock the weighing unit, the solenoid being energized to close the valve and permit retraction of the spring-pressed plunger 262 and thus effect unlocking of the weighing beam upon closing of the switch 266 by cam 268, as above described. Since the cam shaft 270 makes one-half a revolution for each revolution of the filling units, the valve 264 is closed only during the check weighing portion of the weighing cycle, the weighing unit remaining locked during the filling operation and during the entire correcting cycle, as diagrammatically indicated in the cam chart, Fig. 14, and in the timing charts, Figs. 19 and 20. As shown in Fig. 18, the circuit to the scale lock solenoid 264 includes the line 432 to the cam operated switch 266, and line 434 to one terminal of the solenoid, the other terminal being connected by lines 436, 330 and switch 332 to the return line 325.

As diagrammatically indicated in Fig. 15, the air line 248 is connected by a pipe 438 to a pressure indicator dial 440 and to recording mechanism, indicated generally at 442, which includes a chart 444 arranged to be rotated during the operation of the machine, and a stylus unit 446 arranged to be moved laterally by the pressure supplied in the pipe 438 and arranged to be actuated to mark the chart when the check weighing unit indicates the weight of the load. As shown in Fig. 18, the chart motor 448 is included in a circuit from line 432 and includes a switch 450 and line 452 to one terminal of the motor, the other terminal being connected by a line 454, switch 456 and line 458 to the return line 330. The stylus 446 may be actuated by a solenoid 460 arranged to be actuated by a cam operated switch 462 in a circuit including lines 464 and 466 in parallel with the chart motor circuit, the cam 468 for operating the stylus switch 462 being mounted on the cam shaft 270, as shown in Figs. 1 and 2. As indicated in Fig. 18, the stylus circuit includes a temperature control rheostat 470 and a transformer 472 in parallel with the stylus solenoid circuit. In practice when it is desired to manually effect operation of the correcting mechanism, the automatic correcting mechanism may be rendered inoperative by opening the circuit at switch 306 and closing the circuit at the manual correction switch 304, switches 474 and 476 being arranged for manual operation to close the circuits to the motor starter 201I or 201R to effect either an increase or a decrease in the measured loads.

From the above description it will be seen that the present filling machine is adapted to selectively correct the volume of the filling chambers in accordance with the weight of a check weighed load whereby to effect a relatively small volume change when the load is only slightly over or under a predetermined weight without prescribed ranges, and to effect a larger volume change when the check weighed load is greatly over or underweight within predetermined ranges from the predetermined weight. In the drawings the notations relative to "single correction" and "double correction" are intended to indicate a small correction and a larger correction respectively and not necessarily that one correction is double that of the other, since the cams determining the correcting interval may be designed to make different corrections in any desired number of ranges.

While the preferred embodiment of the invention has been herein illustrated and described, it will be understood that the invention may be embodied in other forms within the scope of the following claims.

Having thus described the invention, what is claimed is:

1. In a machine of the character described, in combination, a plurality of measuring chambers mounted to be continuously moved in a closed path, check weighing means operative during one period of operation and mounted to be continuously moved in a closed path, means for delivering a measured load from one of the measuring chambers to said check weighing means during the continuous movement of both, means operative during a succeeding period of operation for varying the volume of said plurality of measuring chambers in the event that the check weighing operation indicates a deviation from a predetermined weight of the weighed load beyond predetermined limits, and means for selectively controlling said volume varying means to produce a relatively small volume variation when the check weighing operation indicates a relatively small weight deviation from a predetermined weight, and to produce a relatively large volume variation when the check weighing operation indicates a relatively large weight deviation beyond said predetermined limits.

2. In a machine of the character described, in combination, a plurality of measuring chambers mounted to be continuously moved through a closed path, means for filling said chambers during their movement through one portion of said closed path, a check weigher operative during one period of operation and mounted to be continuously moved in said closed path, means for selectively delivering at least one of a group of said measured loads to said check weigher during the continuous movement of said measuring chambers, and control mechanism operative during a succeeding period of operation and operatively connected with said measuring chambers for thereafter varying the volume of said chambers in the event that said check weighing operation indicates a deviation in the weighed load beyond predetermined limits, said control mechanism including means for selectively controlling said volume varying means to effect either a large or a small variation in volume according to the deviation in weight within predetermined ranges as indicated by said check weighing means.

3. A machine as defined in claim 2 wherein the volume varying means includes pneumatic control mechanism cooperating with said check weighing means and an electrical circuit including a plurality of pneumatically operated switches arranged to be actuated by different pressures in said pneumatic control mechanism to effect either an increase or a decrease in the volume of the measuring chambers in accordance with the deviation in weight as detected by said check weighing means.

4. In a machine of the character described, in combination, means for forming a plurality of measured loads, container feeding mechanism for presenting successive containers into operative position with relation to said load forming means, check weighing means operative during one period of operation, means for delivering a measured load to said check weighing means prior to its delivery into a container, means operative during a succeeding cycle of operation and responsive to the operation of the check weighing means for varying the volume of the loads thereafter formed by said load measuring means, and means for selectively controlling said volume varying means to effect either a preselected large or a preselected small variation in volume according to the deviation in weight within different predetermined ranges as indicated by said check weighing means.

5. A machine as defined in claim 4 wherein the volume varying means includes pneumatic control mechanism cooperating with said check weighing means and an electrical circuit including a plurality of pneumatically operated switches arranged to be actuated by different pressures in said pneumatic control mechanism to effect either an increase or a decrease in the volume of the measuring chambers in accordance with the deviation in weight as detected by said check weighing means, and cam operated switches in said circuit connected to different ones of said pneumatically operated switches arranged to effect either a longer or a shorter volume correcting interval in accordance with the amount of deviation from a predetermined weight as detected by said check weighing means.

6. A machine as defined in claim 4 wherein the volume varying means includes pneumatic control mechanism cooperating with said check weighing means and an electrical circuit including a plurality of pneumatically operated switches arranged to be actuated by different pressures in said pneumatic control mechanism to effect either an increase or a decrease in the volume of the measuring chambers in accordance with the deviation in weight as detected by said check weighing means, said different pneumatically operated switches being arranged to be actuated to indicate different overweight or underweight conditions of the check weighed load within different predetermined ranges of a predetermined weight whereby to effect a relatively small volume correction when the deviation in weight is relatively small and to effect a relatively large volume correction when the deviation in weight is relatively large.

7. A machine as defined in claim 4 wherein the machine operates in cycles comprising a check weighing cycle and a volume correcting cycle, and means for rendering the check weighing mechanism inoperative during the volume correcting cycle.

8. In a rotary volumetric filling machine having a plurality of adjustable load forming chambers and means for delivering the measured loads into containers, in combination, check weighing mechanism associated with one of said chambers arranged to receive and check weigh the load during one period of operation, means for adjusting said chambers including a reversible motor arranged to increase or decrease the volume of the chambers, and control means operative during a succeeding period of operation and responsive to the operation of said check weigher including a pneumatic pressure responsive unit arranged to control the operation of said motor to effect an increase or a decrease in volume and in different amounts in accordance with different deviations in the weight of said load within predetermined ranges, said control means including a plurality of pneumatically operated switches in circuit with said reversible motor and arranged to be actuated by progressively higher pressures created in said pneumatic pressure responsive unit, relatively low pressures in said unit indicating underweight loads effecting closing of a circuit through selected of said switches to said motor to effect rotation in a direction to increase the volume of said chambers, and relatively higher pressures in said unit indicating overweight loads effecting closing of the circuit through others of said switches to effect rotation of the motor in a direction to decrease the volume of said chambers.

9. In a rotary volumetric filling machine having a plurality of adjustable load forming chambers and means for delivering the measured loads into containers, in combination, check weighing mechanism associated with one of said chambers arranged to receive and check weigh the load during one period of operation, means for adjusting said chambers including a reversible motor arranged to increase or decrease the volume of the chambers, control means operative during a succeeding period of operation and responsive to the operation of said check weigher including a pneumatic pressure responsive unit arranged to control the operation of said motor to effect an increase or a decrease in volume and in different amounts in accordance with different deviations in the weight of said load within predetermined ranges, said control means including a plurality of pneumatically operated switches in circuit with said reversible motor and arranged to be actuated by progressively higher pressures created in said pneumatic pressure responsive unit, relatively low pressures in said unit indicating underweight loads effecting closing of a circuit through selected of said switches to said motor to effect rotation in a direction to increase the volume of said chambers, and relatively higher pressures in said unit indicating overweight loads effecting closing of the circuit through others of said switches to effect rotation of the motor in a direction to decrease the volume of said chambers, and a plurality of cam operated switches in circuit with different ones of said pneumatically operated switches arranged to maintain the circuit to said motor closed for different time intervals to effect either a large or a small adjustment of said load forming chambers in accordance with the extent of deviation from a predetermined weight as indicated by said check weighing mechanism.

10. A volumetric filling machine as defined in claim 9 wherein the machine is arranged to operate in successive cycles including a check weighing cycle and a volume correcting cycle, and pneumatically operated means for preventing operation of said check weighing means during the volume correcting cycle.

11. A volumetric filling machine as defined in claim 10 wherein the circuit to said motor includes a signal switch arranged to be closed momentarily near the end of the check weighing cycle, and a magnetic relay holding circuit associated with each of said pneumatically operated switches for maintaining the selected circuit closed during the correcting cycle.

12. A volumetric filling machine as defined in claim 9 which includes a recording chart, and a pneumatically operated stylus cooperating with said chart, said stylus being movable relative to the chart in accordance with the pressure created in said pressure responsive unit at the end of the check weighing operation.

13. A volumetric filling machine as defined in claim 9 wherein the pressure responsive unit is associated with a pressure regulating unit connected to a higher source of pressure arranged to amplify the pressure built up in said pressure responsive unit for operating said pneumatically operated switches.

14. In a rotary volumetric filling machine, in combination, a continuously rotated central shaft, a plurality of adjustable load forming chambers mounted to rotate with the shaft, check weighing means associated with one of the chambers also mounted to rotate with the shaft, means for delivering a measured load from said one measuring chamber to said check weighing means during the rotary movement, chamber adjusting means, control means responsive to said check weighing means including pneumatically operated elements for effecting adjustment of the measuring chambers in the event the check weigher indicates a deviation from a predetermined weight beyond predetermined limits, means for supplying air under pressure to said pneumatically operated elements during said continuous rotation including passageways formed in said shaft, said passageways terminating in peripheral grooved portions, air conduits connected to the supply and to said elements communicating with said grooves, and means for supporting said conduits in airtight relation with respect to said grooves.

15. In a rotary volumetric filling machine, in combination, a continuously rotated central shaft, a plurality of adjustable load forming chambers mounted to rotate with the shaft, check weighing means associated with one of the chambers also mounted to rotate with the shaft, means for delivering a measured load from said one measuring chamber to said check weighing means during the rotary movement, chamber adjusting means, control means responsive to said check weighing means for effecting adjustment of said measuring chambers in the event that the check weigher indicates a deviation from a predetermined weight beyond predetermined limits, said control means including pneumatically operated elements disposed adjacent the upper end of the shaft, means for supplying air under compression to said pneumatically operated elements during said continuous rotation including longitudinal passageways terminating adjacent the upper and lower ends of the shaft in radial passageways communicating with individual spaced peripheral grooves, air conduits communicating with said grooves, and means for supporting the conduits in airtight relation with respect to the grooves.

16. A rotary volumetric filling machine as defined in claim 15 wherein the lower end of the shaft is provided with a bushing fast thereon and having radial passageways in communication with the shaft passageways and with peripheral grooves formed in said bushing, and wherein the means for supporting the lower air conduits in airtight relation with respect to the grooves comprises a stationary bearing member attached to the machine frame.

17. A rotary volumetric filling machine as defined in claim 15 wherein the control means includes means for selectively controlling the chamber adjusting means to produce different adjustments for different variations in weight as indicated by said check weighing means, said selective control means including pneumatically actuated means responsive to different variations in air pressure from the pneumatically operated elements associated with the check weighing means, one of said longitudinal passageways comprising a return passageway connecting the pneumatically operated elements and the pneumatically actuated means.

18. In a rotary volumetric filling machine operating in successive cycles, in combination, a plurality of adjustable load forming chambers, means for delivering the measured loads into containers, check weighing means associated with one of said chambers arranged to receive and check weigh the load during one cycle of operation, means operative during a succeeding cycle of operation for correcting the volume of said load forming chambers in response to the operation of said check weighing means in the event of any deviation in the weight of the load beyond predetermined limits of a predetermined weight, and means for operating the machine in alternate check weighing and volume correcting cycles including control means for rendering the check weighing means operative during a portion of one cycle of operation to determine the extent of such deviation, and for rendering the volume correcting means operative during the succeeding cycle to effect a correction indicated by the check weighing means during the preceding cycle.

19. In a rotary volumetric filling machine operating in successive cycles, in combination, a plurality of adjustable load forming chambers, means for delivering the measured loads into containers, check weighing means associated with one of said chambers arranged to receive and check weigh the load, means for correcting the volume of said load forming chambers in response to the operation of said check weighing means in the event of any deviation in the weight of the load beyond predetermined limits of a predetermined weight, and means for operating the machine in alternate check weighing and volume correcting cycles including control means for rendering the check weighing means operative during a portion of one cycle of operation to determine the extent of such deviation, and for rendering the volume correcting means operative during the succeeding cycle to effect a correction indicated by the check weighing means during the preceding cycle, said control means including a pneumatically operated locking unit normally in locking engagement with said check weighing means, an air supply line to said locking units, a solenoid operated air valve in said supply line, and a cam operated switch in circuit with said solenoid operated valve for operating the same to effect unlocking of the check weighing means during said portion of one cycle.

20. In a rotary volumetric filling machine, in combination, a plurality of load forming chambers, means for delivering the measured loads into containers, check weighing means associated with one of said chambers arranged to receive and check weigh the load during one period of operation prior to delivery into a container, means operative during a succeeding period of operation for adjusting the volume of said chambers in the event that the check weighing operation indicates a deviation from a predetermined weight of the weighed load beyond predetermined limits, and means for selectively controlling said volume adjusting means to produce different increments of adjustment in accordance with different limits of deviation from said predetermined weight.

21. In a rotary filling machine, in combination, a plurality of load forming chambers, means for delivering the measured loads into containers, check weighing means associated with one of said chambers arranged to receive and check weigh the load during one period of operation prior to delivery into a container, means operative during a succeeding period of operation for adjusting the volume of said chambers in the event that the check weighing operation indicates a deviation from a predetermined weight of the weighed load beyond predetermined limits, and means for selectively controlling said volume adjusting means to produce different increments of adjustment in accordance with different limits of deviation from said predetermined weight, said check weighing means including a cantilever spring weighing beam arranged to be deflected under the influence of a load a distance proportional to the weight of the load, a pneumatically operated measuring unit for measuring said deflection and producing pressure variations in said unit proportional to the weight, said selective control means being responsive to said pressure variations for selectively adjusting the load forming chambers in accordance with different deviations in the weight of the load from said predetermined limits.

22. A rotary volumetric filling machine as defined in claim 21 wherein pressures below a predetermined limit indicating an underweight load are arranged to increase the volume of the chambers different increments in accordance with different deviations in the weight of the load, and pressures above a predetermined limit indicating an overweight load are arranged to decrease the volume of the chambers different increments in accordance with different deviations in said weight.

23. A rotary volumetric filling machine as defined in claim 22 wherein pressures within said predetermined limits are arranged to render the volume adjusting means inoperative.

References Cited in the file of this patent

UNITED STATES PATENTS

| | | |
|---|---|---|
| 928,658 | Hoyt | July 20, 1909 |
| 1,527,030 | Delamere et al. | Feb. 17, 1925 |
| 2,037,484 | Raymer et al. | Apr. 14, 1936 |
| 2,050,496 | Mayo | Aug. 11, 1936 |
| 2,076,617 | Cleaves | Apr. 13, 1937 |
| 2,116,895 | Howard | May 10, 1938 |
| 2,503,295 | Palmer | Apr. 11, 1950 |
| 2,616,652 | Rose | Nov. 4, 1952 |
| 2,628,055 | Knobel et al. | Feb. 10, 1953 |